US009246149B2

(12) United States Patent
Manthiram et al.

(10) Patent No.: US 9,246,149 B2
(45) Date of Patent: Jan. 26, 2016

(54) POROUS CARBON INTERLAYER FOR LITHIUM-SULFUR BATTERY

(71) Applicants: Arumugam Manthiram, Austin, TX (US); Yu-Sheng Su, Austin, TX (US)

(72) Inventors: Arumugam Manthiram, Austin, TX (US); Yu-Sheng Su, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 104 days.

(21) Appl. No.: 13/955,983

(22) Filed: Jul. 31, 2013

(65) Prior Publication Data
US 2014/0050973 A1   Feb. 20, 2014

Related U.S. Application Data (60) Provisional application No. 61/684,572, filed on Aug. 17, 2012.

(51) Int. Cl.
*H01M 2/16* (2006.01)
*H01M 4/38* (2006.01)
*H01M 10/052* (2010.01)
*B82Y 99/00* (2011.01)
*H01M 4/58* (2010.01)
*H01M 4/02* (2006.01)

(52) U.S. Cl.
CPC .......... *H01M 2/1646* (2013.01); *H01M 2/1613* (2013.01); *H01M 4/38* (2013.01); *H01M 10/052* (2013.01); *B82Y 99/00* (2013.01); H01M 4/5815 (2013.01); H01M 2004/021 (2013.01); Y02E 60/122 (2013.01); Y10S 977/752 (2013.01); Y10S 977/948 (2013.01)

(58) Field of Classification Search
None
See application file for complete search history.

(56) References Cited

U.S. PATENT DOCUMENTS

| 4,130,500 A | * | 12/1978 | Melendres | H01M 4/46 252/182.1 |
|---|---|---|---|---|
| 2005/0042503 A1 | | 2/2005 | Kim et al. | |
| 2011/0139610 A1 | * | 6/2011 | Shirvanian | H01M 4/861 204/275.1 |
| 2011/0200848 A1 | * | 8/2011 | Chiang | B60L 11/1875 429/4 |
| 2011/0242730 A1 | * | 10/2011 | Zhou | H01G 9/02 361/502 |

FOREIGN PATENT DOCUMENTS

| CN | 102185158 | | 9/2011 | .......... H01M 10/058 |
|---|---|---|---|---|
| EP | 2339674 | | 6/2011 | .............. H01M 4/58 |
| EP | 2339674 A1 | * | 6/2011 | ............ H01M 4/136 |
| WO | WO 2006/088861 | | 8/2006 | .............. H01M 2/16 |

OTHER PUBLICATIONS

Su et al, "A new approach to improve cycle performance of rechargeable lithium-sulfur batteries by inserting a free-standing MWCNT interlayer", Chem. Commun. 2012, 48, 8817-8819.*

(Continued)

*Primary Examiner* — Ula C Ruddock
*Assistant Examiner* — Scott J Chmielecki
(74) *Attorney, Agent, or Firm* — Baker Botts L.L.P.

(57) ABSTRACT

The present disclosure relates to an electrochemical cell including an anode, a sulfur-containing cathode, a lithium-ion-containing electrolyte, and a porous carbon interlayer disposed between the anode and the cathode. The interlayer may be permeable to the electrolyte. The interlayer may be formed from a multiwall carbon nanotube (MWCNT) or a microporous carbon paper (MCP).

17 Claims, 8 Drawing Sheets

(56) References Cited

OTHER PUBLICATIONS

International Search Report and Written Opinion; PCT/US2013/053001; pp. 12, Oct. 9, 2013.

Lee et al.; "Electrochemical Performance of Lithium/Sulfur Batteries with Protected Li Anodes"; Journal of Power Sources, vol. 119-121; pp. 9, 2003.

International Preliminary Search Report and Written Opinion for PCT/US2013/053001, 7 pages, Issued Feb. 17, 2015.

* cited by examiner

POROUS CARBON INTERLAYER FOR LITHIUM-SULFUR BATTERY

PRIORITY CLAIM

This application claims priority under 35 U.S.C. §119 to U.S. Provisional Patent Application Ser. No. 61/684,572 filed Aug. 17, 2012. The contents of which is incorporated by reference herein in its entirety.

TECHNICAL FIELD

The present disclosure relates to a porous carbon interlayer for use in a lithium sulfur (Li—S) battery and to batteries containing such an interlayer. In particular, it relates to a porous carbon paper interlayer.

BACKGROUND

Entering a new era of green energy, several criteria such as cost, cycle life, safety, efficiency, energy, and power need to be considered in developing electrical energy storage systems for transportation, such as electric vehicles and grid storage. Li—S batteries are one of the prospective candidates in this regard as sulfur offers a high theoretical capacity of 1675 mAh g$^{-1}$ at a safer operating voltage range of ~2.1 V and lower cost compared to the currently used oxide and phosphate cathodes. With this perspective, there is increasing interest in recent years in Li—S battery research. Development of a high capacity (>800 mAh g$^{-1}$) Li—S system with a long, acceptable cycle life will gives this system a greater opportunity to be commercialized in the near future.

The early-stage research in lithium-sulfur batteries was initiated three decades ago, but the spotlight did not return to this battery system until there was a renewed interest in electric vehicles (EVs) in recent years. The major impediments to the development of Li—S batteries are low active material utilization, poor cycle life, and low charge efficiency. The poor utilization of active material results from the insulating sulfur, which hinders the electron transfer during electrochemical reactions. Also, sulfur molecules form easily-dissolved polysulfide intermediates with lithium ($Li_2S_x$, $2<x\leq 8$) in the electrolyte, resulting in severe, irreversible capacity fade. The soluble polysulfides shuttling between the anode and cathode lead to low Coulombic efficiency. Thus, improving the conductivity of the sulfur cathode and maintaining/reutilizing soluble polysulfides within the cathode structure are critical to develop a viable Li—S system.

Many approaches have been explored to tackle the drawbacks of sulfur cathodes, such as synthesizing carbon-sulfur composites and applying surface coatings of conductive polymers. The studies have shown promising improvements in Li—S batteries, but the material processing steps are often elaborate and costly, limiting the feasibility of manufacturing a viable lithium-sulfur cell. Employing sulfur-carbon composites and applying conductive polymer surface modification are the main approaches in laboratories around the world to realize high capacity and improved cycle life. Both approaches enhance the electrical conductivity of the cathode and suppress the loss of soluble polysulfide intermediates during cycling and thereby improve the active material utilization and cyclability. In addition, the issue of low Coulombic efficiency has been resolved by the addition of lithium nitrate to the electrolyte. However, the major stream of Li—S battery research has focused on the modification "inside" of the cathode and electrolyte, but the design "outside" of the cathode such as cell configuration could be a new strategy for improving the performance of Li—S batteries.

SUMMARY

The design of inserting a bi-functional conductive and porous layer between the sulfur cathode and the separator can effectively solve the above issues.

The present disclosure relates to an electrochemical cell including an anode, a sulfur-containing cathode, a lithium-ion-containing electrolyte, and a porous carbon interlayer disposed between the anode and the cathode. The interlayer may be permeable to the electrolyte. The interlayer may be formed from a multiwall carbon nanotube (MWCNT) or a microporous carbon paper (MCP).

BRIEF DESCRIPTION OF THE DRAWINGS

A more complete understanding of the present embodiments and advantages thereof may be acquired by referring to the following description taken in conjunction with the accompanying drawings, in which.

DETAILED DESCRIPTION

The present disclosure relates to a porous carbon interlayer for use in a lithium sulfur battery and to batteries containing such an interlayer. In particular, it relates to a porous carbon paper interlayer. In one embodiment, the carbon paper interlayer may be formed from carbon nanotubes and may have pores with a size in the range of 50 nm to 100 nm. In another embodiment, the carbon paper interlayer may have pores less than 50 nm in size, less than 10 nm in size, or less than 5 nm in size. In some embodiments the pores may be of non-uniform size, while in other embodiments, they may be of uniform size. In some embodiments the interlayer may include a multiwall carbon nanotube (MWCNT). In other embodiments, it may include a microporous carbon paper (MCP).

In one particular embodiment, the carbon interlayer may include a MCP having pores of a uniform size, where in the pores are less than 50 nm in size, less than 10 nm in size, or less than 5 nm in size. This embodiment may exhibit surprisingly enhanced performance, as described herein, as compared to MWCNT embodiments, embodiments with larger pore sizes, or embodiments without uniform pore size.

More specifically, the limitations in the cathode capacity compared with the capacity of anode have been an impediment to make advances in lithium-ion battery area. The lithium-sulfur system has become appealing in this regard as sulfur exhibits an order of magnitude higher capacity than the currently used cathodes. However, low active material utilization and poor cycle life hinder the practicality of Li—S batteries. The present disclosure relates to an adjustment to the traditional Li—S battery system configuration to achieve high capacity with a long, stable cycle life and rapid charge rate. By designing a carbon interlayer, such as a bi-functional microporous carbon paper to act as a liaison between the cathode and separator, a significant improvement may be achieved not only in the efficiency of active material utilization but also in capacity retention, without involving complex synthesis or surface modification methods. The insertion of a microporous carbon interlayer may also decrease the internal charge transfer resistance and localizes the soluble polysulfide species, facilitating a commercially feasible means of fabricating lithium-sulfur batteries.

Furthermore, the disclosure includes a facile method of inserting a bi-functional conductive and porous layer between the sulfur cathode and the separator, which can enhance both the specific capacity and cyclability of Li—S batteries. This method may be facile, scalable, and allow low-cost processing. Inserting a carbon interlayer, such as a free-standing MWCNT film or MCP offers higher capacity and better cyclability than the battery without any insertion layers. Improvements in both the specific capacity and cycle stability of batteries may be achieved. Furthermore, neither exquisite synthesis nor surface modification toward active materials is necessary. The conductive/porous insertion layer as an upper current collector may not only significantly reduces the charge transfer resistance of sulfur cathodes, but also traps the migrating polysulfide ions during cycling. The increased electrode conductivity may promote the active material utilization and high rate battery performance. Furthermore, the porous film is an excellent matrix to retain and accommodate dissolved active materials.

Figure 1:
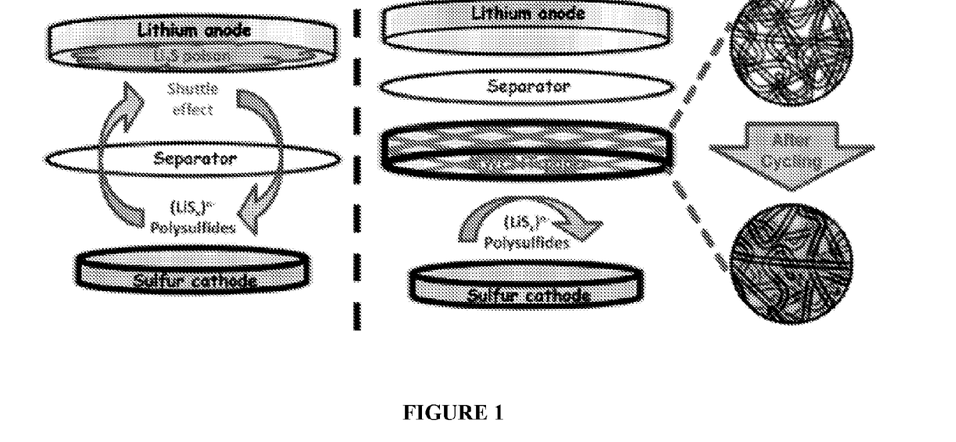
FIG. 1 illustrates a schematic cell configuration of rechargeable Li—S batteries in which (a) is traditional configuration with severe shuttle effect and $Li_2S$ poison problems and (b) is new configuration with a multiwall carbon nanotube (MWCNT) interlayer.
Figure 5:
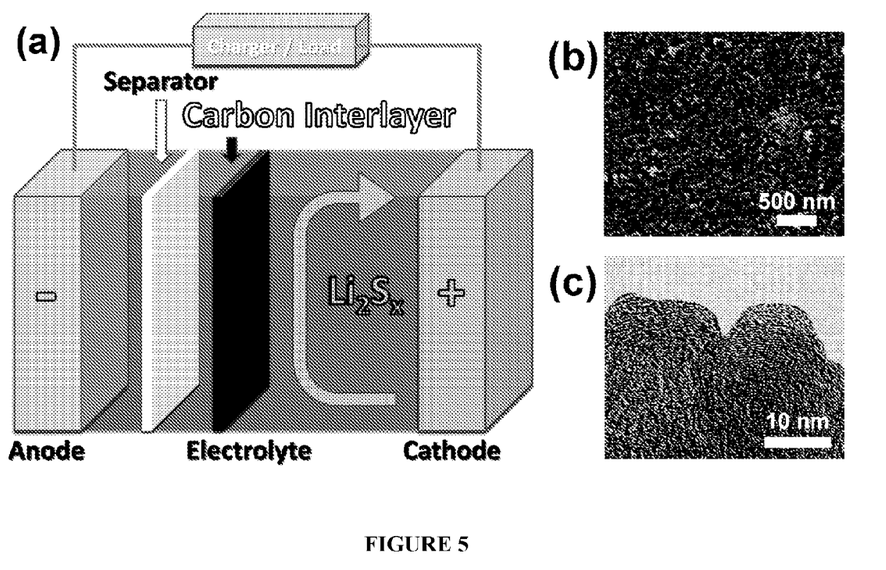
FIG. 5 illustrates a scheme and morphology of a microporous carbon paper (MCP) employed in an Li—S battery in which (a) illustrates a schematic configuration of a Li—S cell with a bi-functional carbon interlayer with micropores inserted between the sulfur cathode and the separator, (b) illustrates an SEM image of the surface of the MCP, and (c) illustrates a TEM image of the microporous carbon particles.

The present disclosure includes Li—S batteries containing a carbon interlayer disposed within the battery as illustrated in FIG. 1 or FIG. 5(a). It furthermore includes equipment including such batteries, such as electric vehicles, energy storage grids, and other complex energy storage systems. The carbon interlayer disclosed herein may be used with Li—S batteries presently in existence or with designs developed in the future that suffer from one or more drawbacks corrected by the carbon interlayer. Although only a Lithium metal anode is illustrated in the figures, one of ordinary skill in the art will understand that other lithium-ion compatible anodes, such as carbon anodes, may be used in some embodiments. Similarly, although only certain sulfur-based cathodes are described herein, one of ordinary skill in the art will understand that other sulfur-based cathodes may also be used. The electrolyte may be selected based on the anode and cathode and other considerations.

The terms "battery" and "cell" or "electrochemical cell" are used interchangeably herein to designate a device having at least and anode, a cathode, and an electrolyte unless otherwise indicated by context.

EXAMPLES

The following examples are provided to further illustrate certain embodiments of the invention. They are not intended to limit the invention to the components, compositions, systems, techniques, or methods described in these examples.

Example 1

MWCNT Carbon Interlayer

A Li—S battery was prepared by inserting a bi-functional, conductive, porous multiwall carbon nanotube (MWCNT) paper between the cathode and the separator, which lead to an enhancement in both the specific capacity and cyclability of Li—S batteries. This free-standing MWCNT paper was first fabricated by an ultrasonic dispersion of synthesized MWCNTs, followed by a simple vacuum filtration without the addition of binders. After this simple treatment, a large piece of MWCNT paper was formed spontaneously and was easily peeled off the filtration membrane A schematic illustration of this design of the lithium-sulfur cell configuration can be seen in FIG. 1. The insertion of the MWCNT film in lithium-sulfur cells reduced the interfacial resistance in sulfur cathodes, and had the added advantage of localizing the polysulfides in the electrolyte, thus avoiding the unwanted migration and diffusion of the dissolved species to the anode. Former studies have demonstrated that carbon nanotubes are excellent substrates for growing sulfur-carbon nanotube composite materials with improved cycle performance. Carbon nanotubes have not only superior electrically conductive network, but also a high tensile strength that stabilizes the cathode structure. This stability is especially useful in accommodating the severe volume change that occurs in sulfur cathodes and preventing the structural failure in the electrodes during the discharge/charge process Not all carbon nanotubes have the ability to form free-standing films through a "self-weaving" behavior. By the same method, a different type of commercial MWCNT with an absolutely straight tube structure failed to form a binder-free film. The tube shapes could be visualized with a scanning transmission electron microscope (STEM). The as-synthesized MWCNT exhibited distinct curvature while the commercial MWCNT is straight. The bent structure of MWCNTs may occur when partial defects occur on the graphene walls or when the MWCNTs have a few graphene layers constituting the tube due to the low elastic modulus. The unique properties of curved walls allow the MWCNTs to easily intertwine with one another.

Figure 2A:
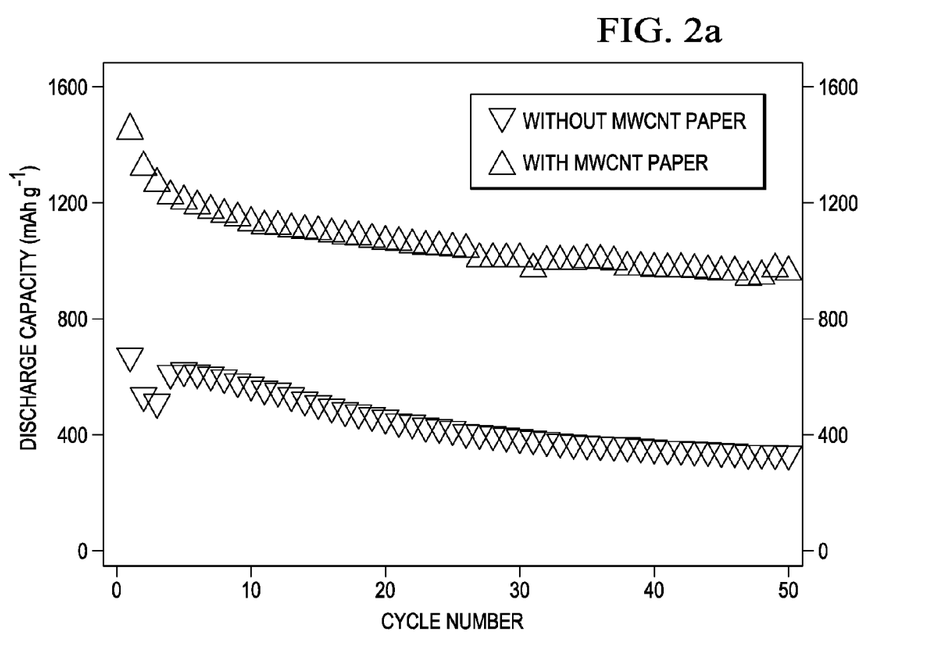
FIG. 2 illustrates electrochemical data obtained from Li—S cells: in which (a) shows cyclability of the cells at C/5 rate, (b) shows area-normalized Nyquist plots of the cells measured before cycling, (c) shows CV plots of the modified cell (first 10 cycles), and (d) shows discharge/charge profiles of the modified cell at 1C rate.
Figure 2B:
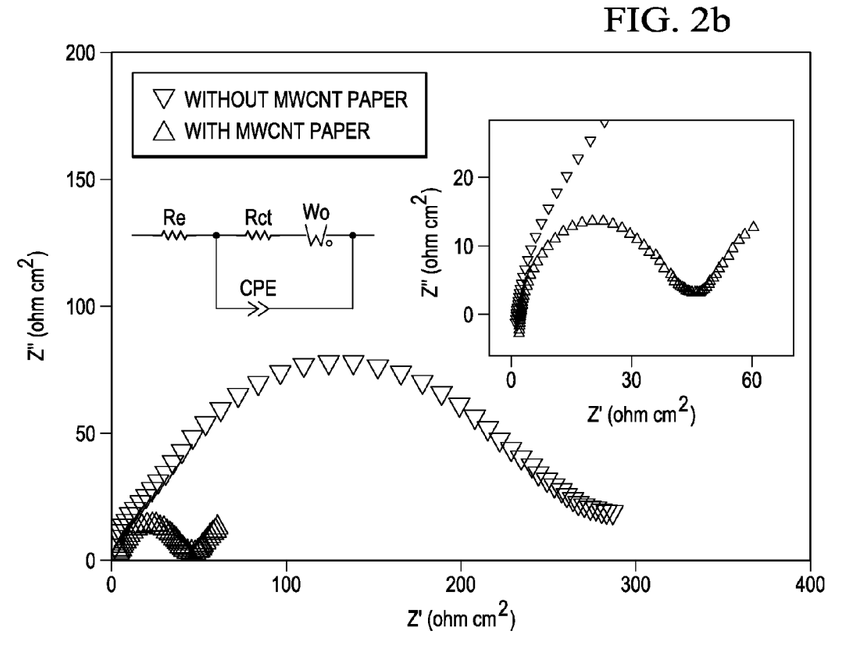
Figure 2C:
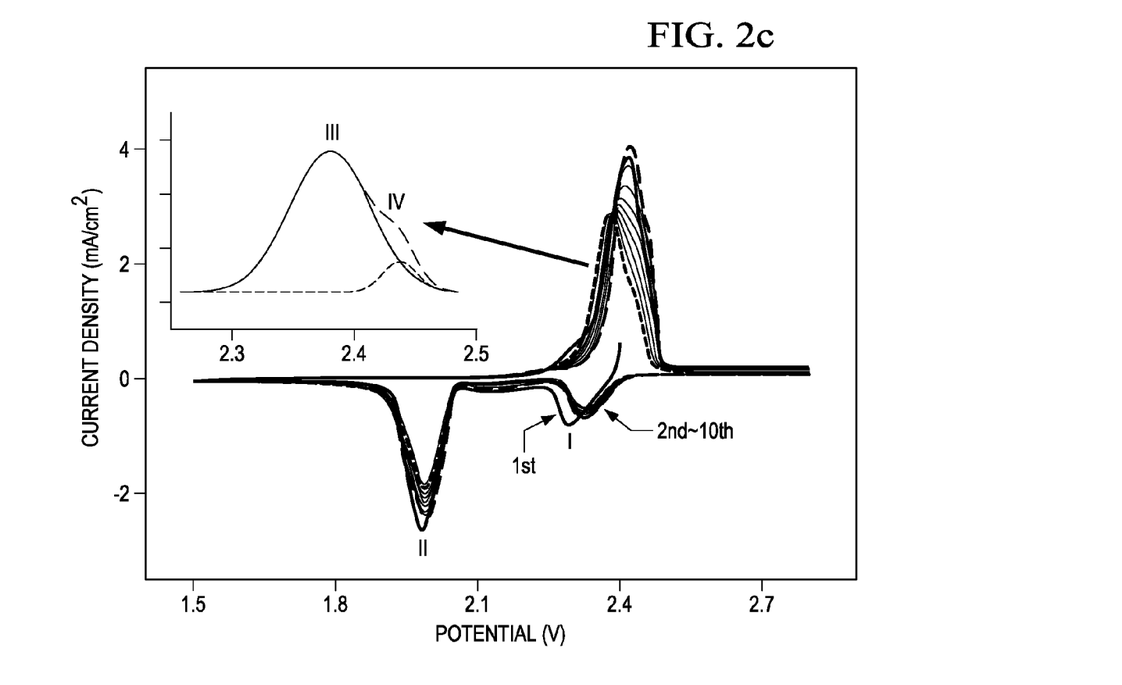

FIG. 2(a) shows the cyclability profile of the Li—S batteries with and without the insertion of the MWCNT paper. With the MWCNT interlayer, the initial discharge capacity of the cell is 1446 mAh g$^{-1}$, which is 86% of the theoretical capacity of sulfur, and more than twice that of the raw lithium-sulfur cell (671 mAh g$^{-1}$). Electrochemical impedance spectroscopy (EIS) is a powerful tool to investigate the internal resistance of Li—S batteries. The diameter of the semicircular portions of the curves in FIG. 2(b) represents the charge transfer resistance ($R_{ct}$), which is mainly generated at the interface between the electrode and the electrolyte. After the addition of the MWCNT paper, the $R_{ct}$ value was dramatically decreased from 277 to 38 Ωcm$^2$ (calculated after the electrode area normalization). The conductive interlayer acts as a pseudo-upper current collector, reducing the effective resistance from the highly insulating sulfur cathodes. Therefore, the huge enhancement in the active utilization can be attributed to the electrode surface in nanoscale contact with the conductive network of the MWCNT paper, which allows electrons to flow freely through the cathode and accelerates the kinetics of the electrochemical reactions.

The lithium-sulfur cell with the MWCNT interlayer (FIG. 2(a)) also exhibited excellent cycling stability, with the specific capacity remaining high at 962 mAh g$^{-1}$ after the 50$^{th}$ cycle at a current density of 335 mA g$^{-1}$ (C/5, C=1675 mA g$^{-1}$). In contrast, the raw lithium-sulfur cell showed only ~330 mAh g$^{-1}$ after 50 cycles under the same cycling conditions. The cyclic voltammetry (CV) scans of the Li—S battery with the MWCNT interlayer (FIG. 2(c)) nearly overlapped for the first ten cycles without any obvious change in peak intensities or locations, demonstrating the excellent cycle stability of this system. The slight overpotential of the first reduction peak (I) is eliminated after the first cycle was due to the rearrangement of active sulfur from its original positions to more energetically stable sites with lower resistance. The two reduction peaks (I & II) were consistent with the two discharge plateaus (I & II) in the discharge/charge profiles (FIG. 2(d)). Similarly, the two oxidation peaks (III & IV) correspond to the two charge plateaus (III & IV) as well. Plateau I is attributed to the reduction of elemental sulfur ($S_8$) to soluble polysulfides ($Li_2S_4$). Plateau II is regarded to correspond to the formation of solid $Li_2S_2$ and subsequently $Li_2S$, and Plateau III represents the backward reaction from $Li_2S$ and $Li_2S_2$ to $Li_2S_4$. Plateau IV is ascribed to the oxidation of $Li_2S_4$ to $Li_2S_8$/S. This two-step electrochemical reaction observed in the discharge and charge processes is typical of Li—S batteries. A small discharge plateau is found at the end of the discharge process, which can be ascribed to the irreversible reduction of LiNO$_3$ in the electrolyte.

Figure 2D:
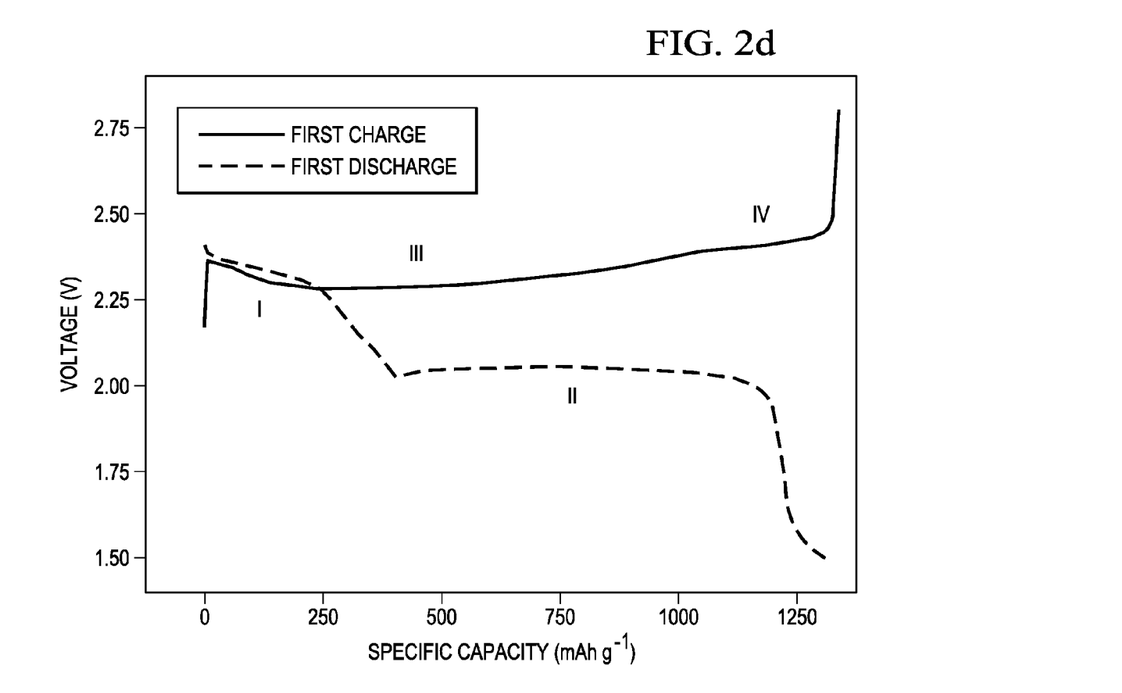
Figure 3:
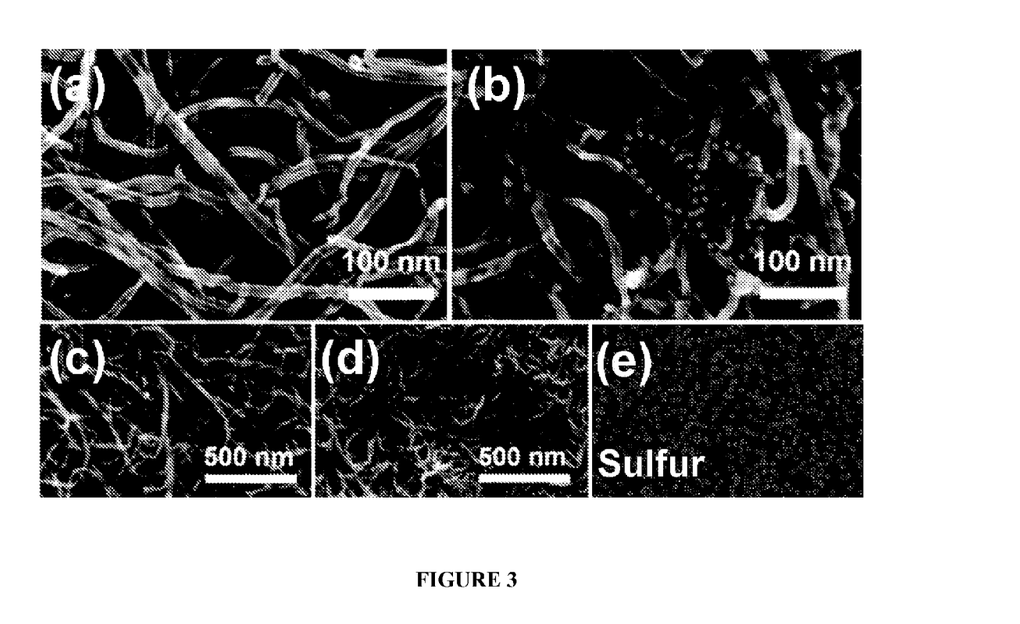
FIG. 3 illustrates morphology of the MWCNT paper, in which (a) illustrates morphology before cycling, (b) illustrates morphology after 100 cycles at 1C rate, (c) illustrates raw tube structure before cycling, (d) illustrates swollen tube structure after cycling, and (e) illustrates an elemental mapping of (c)

To further investigate the reason why a simple porous interlayer can considerably advance the performance of the Li—S battery cells, an ex situ scanning electron microscope (SEM) analysis was carried out on cycled electrodes. The microstructure image of the as-synthesized free-standing MWCNT paper with a porous structure is shown in FIG. 3(a), where circuitous carbon nanotubes interlace. Porosity of the interlayer is important because electrolyte must permeate through the layer to allow electrochemical reactions to proceed in the cathode. Also, the tortuous pores in the paper can localize the polysulfide species diffusing from the cathode and the MWCNT skeleton is able to endure the volume change of trapped active material during cycling due to its unique mechanical properties. The appearance of the MWCNT film covering the electrode after 100 cycles (FIG. 3(b)) demonstrated a build-up of the active material, indicating that the carbon nanotubes act as a matrix to capture and retain the polysulfide species by electrochemical deposition at the end of discharge/charge and work as second redox reaction sites. By inspection, it is clear that the tube size swelled after cycling as shown in FIG. 2(d) compared to that before cycling as exhibited in FIG. 2(c), which proves the excellent capability of the MWCNTs to trap polysulfides. FIG. 2(e) indicates the elemental mapping of the cycled electrode covered by the MWCNT paper, where sulfur is distributed homogeneously throughout the MWCNT interlayer. Although a portion of the active material might form an agglomeration in the interlayer network electrons can still easily pass through the insulating bulk via the MWCNTs penetrating inside the inactive region to activate discharge/charge reactions. Dispersing active material in the sturdy conductive framework homogeneously is key to ensuring the cycle stability of Li—S batteries, and the design of the interlayer allows the cathode region to maintain a stable structure with trapped polysulfide species.

Figure 4:
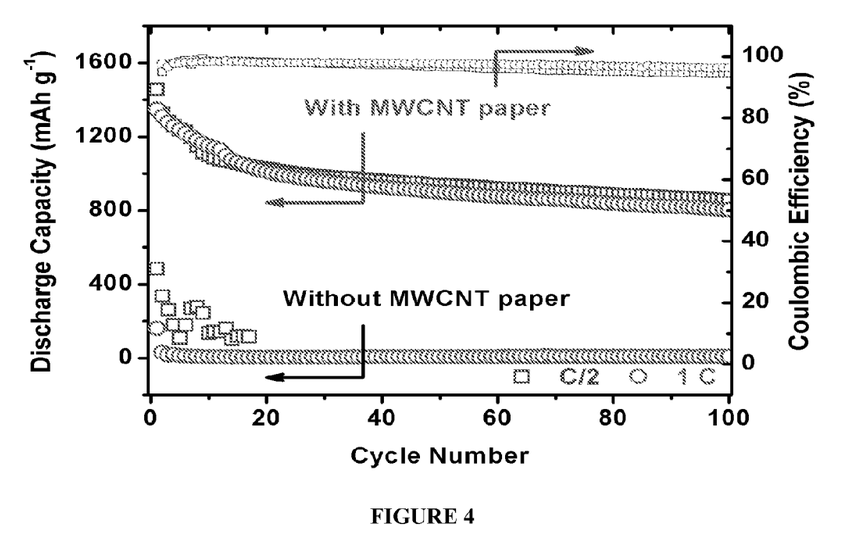
FIG. 4 illustrates high-rate cycle performance and Coulombic efficiency of the lithium-sulfur cells with and without the MWCNT interlayer.

The Li/MWCNT interlayer/S battery system also performed well in high rate applications. At discharge/charge rates of C/2 and 1 C, the cells maintain high capacities of 855 and 804 mAh g$^{-1}$, respectively, after 100 cycles (FIG. 4). The design used effectively enhanced the rate performance of lithium-sulfur cells. The highly conductive MWCNT interlayer effectively promoted rapid electrochemical reactions in Li—S batteries due to the descending interfacial resistance and abundant reaction cites introduced from the MWCNTs. As a result, the insertion of a MWCNT paper is a facile configuration modification in Li—S batteries to improve the rate capability.

The Coulombic efficiency, which is calculated by dividing the discharge capacity by the previous charge capacity, was improved by the incorporation of nitrate salts into the electrolyte. With the addition of 0.1 M LiNO$_3$ salt, the Coulombic efficiency increases to 98%. Nitrate anions are a proven passivator of lithium metal anodes, which mitigates issues arising with corrosion and shuttle effect from the migrating polysulfides. The average Coulombic efficiency of lithium-sulfur cells with the MWCNT interlayer at C/2 and 1 C is above 96% for 100 cycles (FIG. 4).

In summary, the novel configuration of inserting a free-standing MWCNT paper in the Li—S battery significantly enhances both the specific capacity and cycle stability. Furthermore, complex synthesis and surface modification are not necessary to achieve high-performance Li—S cells. The conductive MWCNT interlayer as a pseudo-upper current collector not only reduces the charge transfer resistance of sulfur cathodes significantly, but also captures the migrating active material at the end of cycles. The increased electrical conductivity promotes efficient active material utilization and stable high rate battery performance with long cycle life. In addition, the porous MWCNT paper offers the advantage of serving as an excellent matrix to retain and accommodate dissolved intermediate polysulfides.

Example 2

MCP Carbon Interlayer

Insertion of an electrolyte-permeable microporous carbon paper (MCP) between the separator and cathode disk improved the electrochemical performance of Li—S cells. This design of cell configuration can effectively decrease the resistance of sulfur cathodes, resulting in an enhancement of active material utilization. Additionally, a carbon interlayer with micropores facilitates the absorption of soluble polysulfides shuttling in the electrolyte and makes them available to be reutilized even during long cycles. This bi-functional carbon interlayer may be treated as a second current collector for accommodating the migrating active material from sulfur cathodes. This novel approach may not only simplify the battery processing without elaborate synthesis of composites and surface chemistry modification, but may also improve the capacity and cycle life, thereby promoting the practicality of Li—S batteries.

The battery configuration of a Li—S cell with a bi-functional microporous carbon interlayer is displayed in FIG. 5(a). The conductive carbon interlayer may be placed between the separator and cathode in order to capture the migrating polysulfides ($Li_2S_x$) from the cathode during electrochemical reactions, but without contacting the lithium anode. In this example, pure sulfur powder was employed as the active material to make conventional sulfur cathodes instead of using specialized composites or adopting any surface chemistry modification in order to demonstrate that the observed improvement in cyclability is only contributed by the carbon interlayer. FIG. 2(b) shows the scanning electron microscope (SEM) image of the MCP used in this study as the interlayer. It can be seen that the carbon particles in the film is nano-sized, which is able to provide subtle surface contact with the sulfur cathode to reduce the electrical resistance. In addition, the interlayer surface is highly porous, resulting in good electrolyte penetration during cycling. The particle size of the carbon nanoparticles in the MCP ranges between 20-40 nm (FIG. 5(c)), and no mesopores with a diameter >5 nm were found in the carbon.

Figure 6:
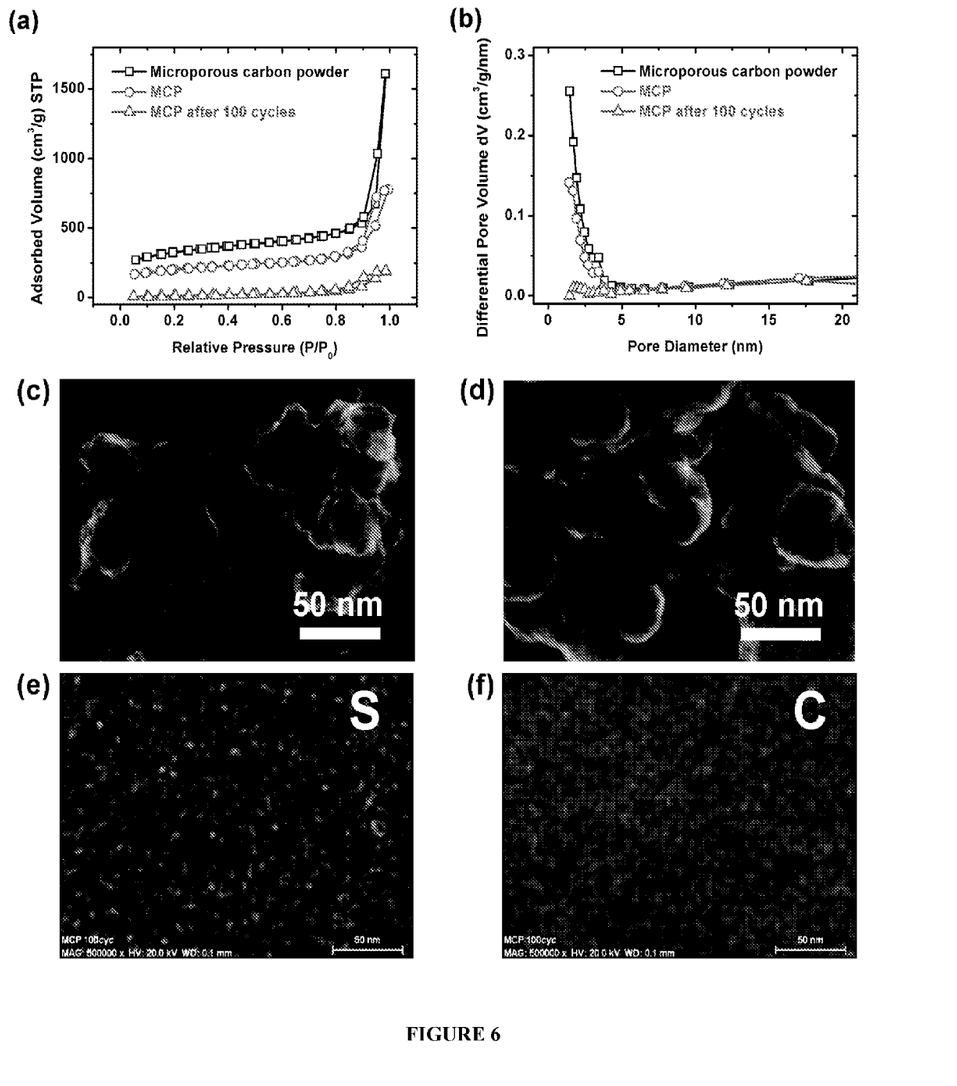
FIG. 6 illustrates nitrogen adsorption/desorption analysis, SEM images, and EDS mapping results of the MCP in which (a) illustrates isotherms, (b) illustrates pore size distributions of the microporous carbon powder, MCP, and MCP as an interlayer in the Li—S cell at 1C rate after 100 cycles, (c) illustrates SEM images of the MCP before cycling, (d) illustrates SEM images of the MCP after cycling, (e) illustrates elemental mapping of sulfur in (d) and (f) illustrates elemental mapping of carbon in (d)

The nitrogen adsorption/desorption isotherms of MCP as the interlayer in Li—S batteries before and after cycling is displayed in FIG. 6(a). It can be seen that both the microporous carbon powder and MCP exhibited mixed type I and type II isotherms, respectively, for low relative pressure ($P/P_0$) and high $P/P_0$. The raw microporous carbon powder and MCP have certain nitrogen adsorption below the relative pressure of $P/P_0 < 0.1$, indicating the existence of micropores. The rise after $P/P_0 > 0.9$ represents the integral porosity of MCP contributed by the interspaces between the carbon nanoparticles, offering abundant channels for liquid electrolyte. The amount of mesopores was limited because of the gentle adsorption slope at $P/P_0 = 0.1$–$0.9$. The MCP as the interlayer after cycling showed almost zero adsorption at the micropore region, demonstrating that these micropores were filled during the discharge/charge of the Li—S cells. A depletion of the hysteresis loop was found in the cycled MCP, also indicating a portion of mesopores are filled. The total surface area of pristine MCP was as high as 695 m$^2$ g$^{-1}$ (65% contributed by micropores), but that of the MCP after cycling was only 61 m$^2$ g$^{-1}$ due to the filling of the pores in the interlayer. The total pore volume of MCP after 100 cycles was as low as 0.288 cm$^3$ g$^{-1}$ (no micropore volume), which was much less than that of pristine MCP (1.194 cm$^3$ g$^{-1}$; 0.215 cm$^3$ g$^{-1}$ for micropore volume). FIG. 6(b) shows the pore size distributions of the MCP samples, where all specimens had no obvious pores with a diameter over 5 nm. These curves end at the pore diameter below 1.4 nm due to the limitation of the analyzer. The microporous/small-mesoporous peak of the MCP almost vanished after cycling, implying that the migrating active polysulfides might be captured and fill these pores during the electrochemical cycling.

FIGS. 6(c) and 6(d) compare the SEM images of the MCP interlayer before and after cycling. Pristine MCP in FIG. 6(c) exhibited a morphology of glue-like particles composed of microporous carbon and binder. The MCP after 100 cycles still had spherical morphology with individual microporous carbon particles, showing that the dissolved active material was probably absorbed by the pores in the interlayer rather than forming large insulating sulfur/lithium sulfide inactive layers. This feature is very useful because irreversible capacity loss would occur if active material agglomerates and non-uniformly covers the cathode, which can block charge transfer reactions and ion transport in the cell. The surface porosity of the MCP after cycling was still maintained, which guaranteed the infiltration of electrolyte. FIGS. 6(e) and 6(f) display the elemental mapping results of the MCP interlayer after cycling. Sulfur signal was found all-over the carbon interlayer and distributed homogenously, ensuring a superior reutilization of the active material and reversibility. Moreover, the carbon signal was also well-distributed and strong in the interlayer, indicating that the conductive carbon was not severely covered by sulfur/sulfides, leading to good conductivity in the cathode region even for long cycles.

Figure 7A:
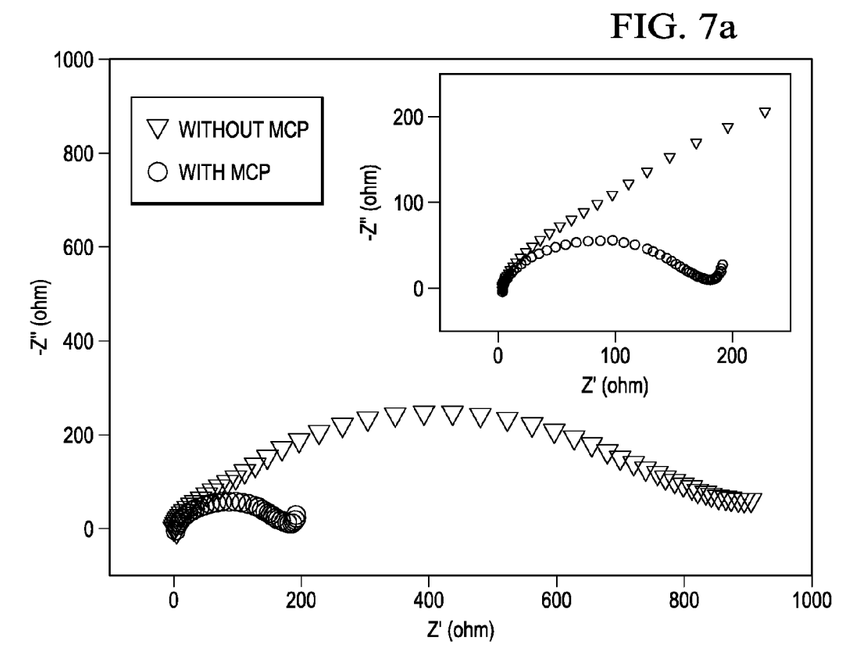
FIG. 7 illustrates electrochemical measurements of Li—S batteries in which (a) illustrates EIS plots of Li—S cells with and without MCP, (b) illustrates CV scans, (c) illustrates discharge/charge profiles at various cycles, (d) illustrates rate capability up to 3C, and (e) illustrates cycle life and Coulombic efficiency of the cell with MCP at 1C and 2C for long cycles.
Figure 7B:
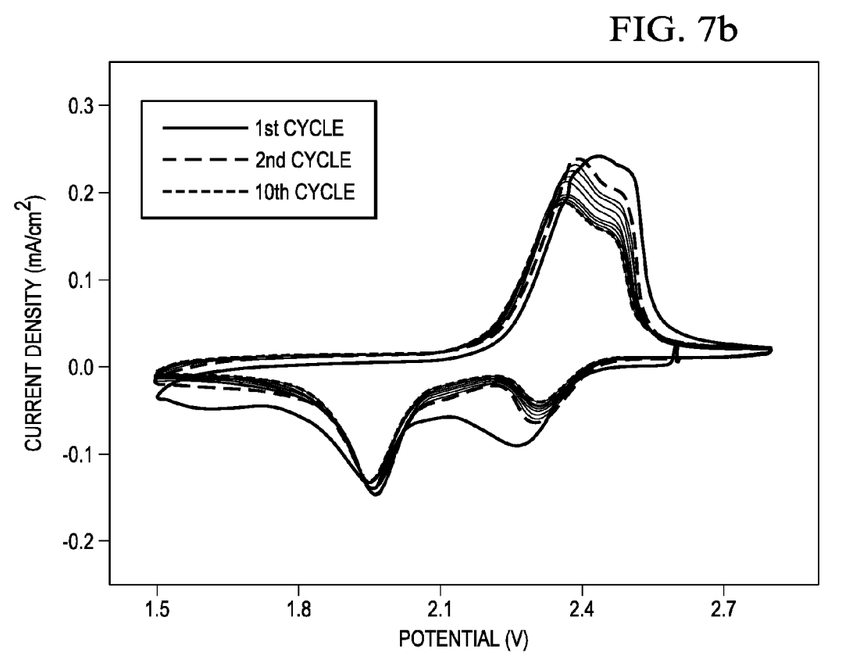
Figure 7C:
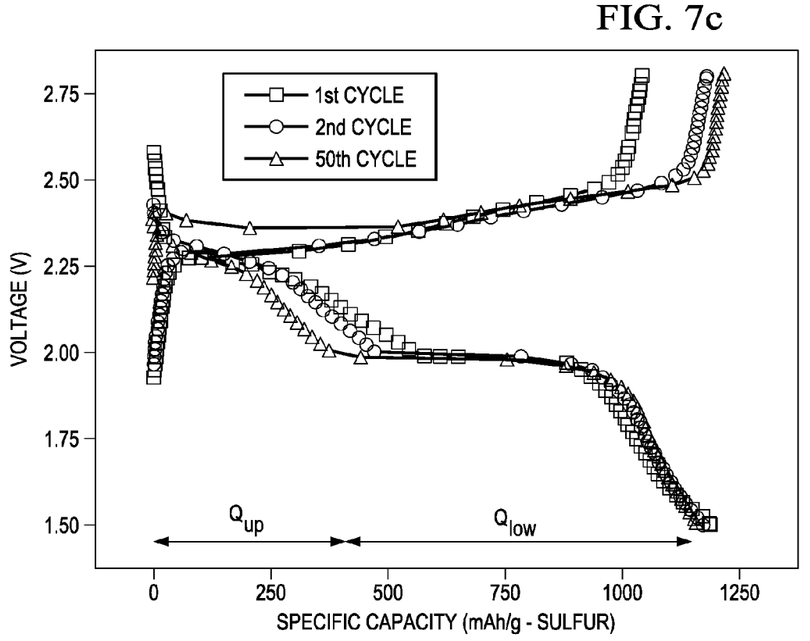

To analyze the impact of the MCP as the carbon interlayer in Li—S batteries, impedance analysis was performed to compare the cells with and without the MCP interlayer before cycling (FIG. 7(a)). The impedance of Li—S batteries located in the high frequency region is regarded as the charge transfer resistance of the cell. The impedance semicircle shrank significantly by about 79% after the insertion of the MCP, demonstrating a dramatic decrease in the charge transfer resistance of the battery. Here, the MCP interlayer worked as an upper current collector for the low-conductivity sulfur cathode, enhancing the active material utilization and thereby raising the specific capacity of the cell. FIG. 7(b) shows the cyclic voltammograms (CV) of the cell with the MCP for the first ten cycles. Two cathodic peaks at around 2.3 and 2.0 V and the two overlapped anodic peaks at around 2.35 and 2.45 V are typical of Li—S cells with carbon-based cathodes. The overpotential of the first cathodic peak disappeared after the first cycle possibly due to the rearrangement of the migrating active material to electrochemically favorable positions. The discharge/charge profiles in FIG. 7(c) exhibiting two discharge plateaus and two closely-spaced charge plateaus, are consistent with the CV plots. The upper discharge plateau represents the transformation of sulfur into long-chain polysulfides and the lower discharge plateau represents the conversion of short-chain polysulfides ($Li_2S_2/Li_2S$), which are reminiscent in the charge plateaus as well. The discharge capacity values of the cell at the first, second, and 50$^{th}$ cycle at 1C rate are identical except for the length ratio between the upper ($Q_{up}$) and lower ($Q_{low}$) plateaus. A much higher $Q_{low}/Q_{up}$ ratio of 2.10 was observed in the cell after 50 cycles compared with that after the first cycle ($Q_{low}/Q_{up}=1.06$). As the representative microporous carbon-sulfur composite cathodes exhibited only the lower discharge plateau during cycling, the stretching $Q_{low}$ corresponded to the capacity contribution from the micropores-trapped active material. Additionally, it appeared that the active material needed to take a few cycles to reach a steady state in the cathode region to offer stable electrochemical performance because of the solubility of the intermediate lithium polysulfides in the electrolyte. The inactive core of sulfur cannot be reutilized until it becomes exposed to the electrolyte after the initial cycles at high C rates[25], which is evident in the second cycle where the discharge capacity is even higher than the first charge capacity (FIG. 7(c)).

Figure 7D:
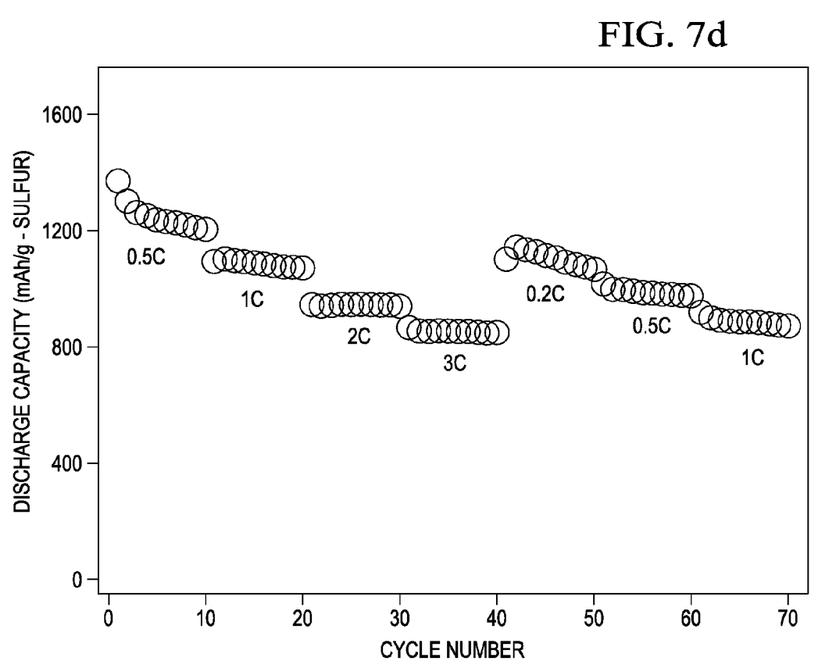
Figure 7E:
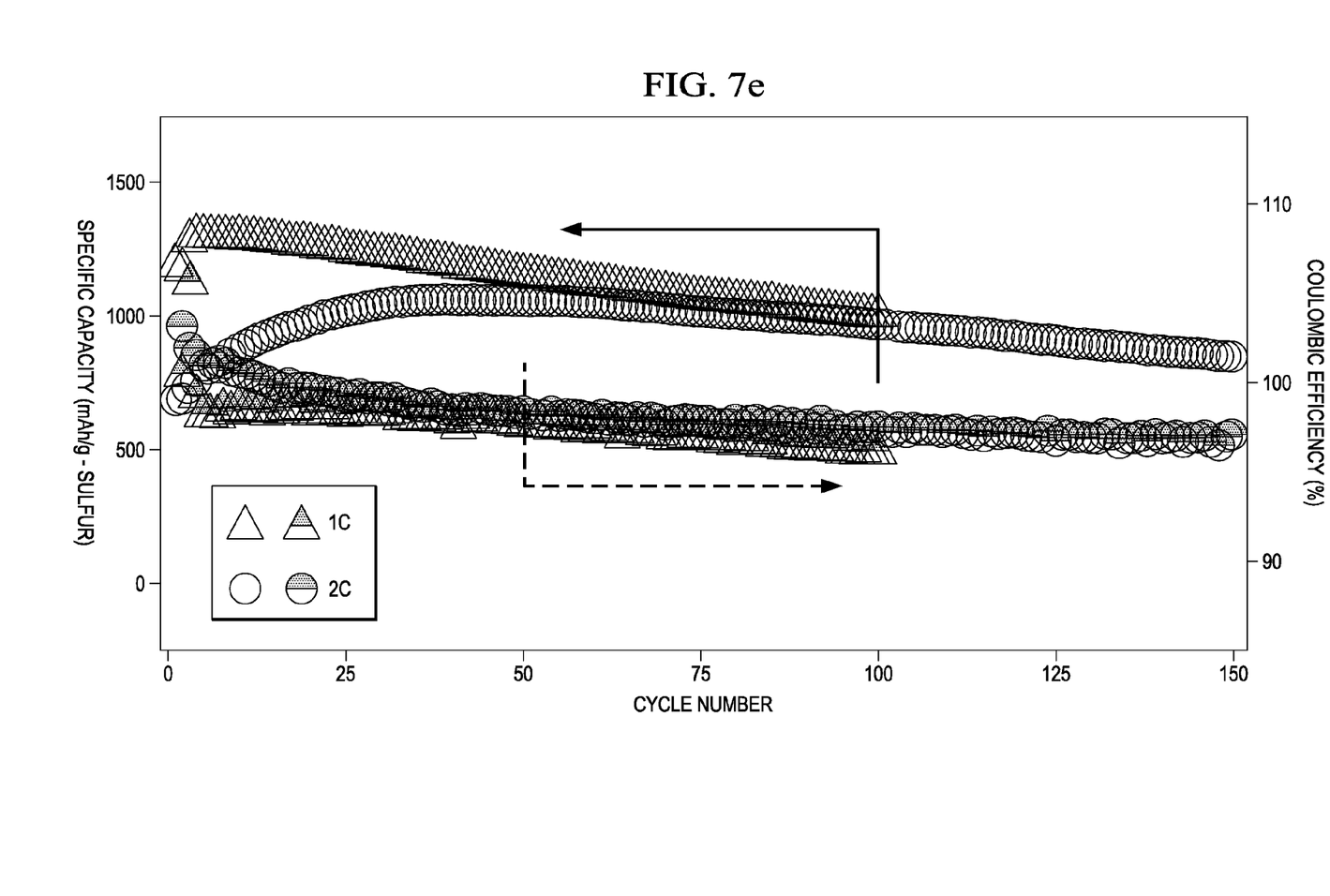

The rate capability of the cell with the MCP is shown in FIG. 7(d). The C rates specified were based on the mass and theoretical capacity of sulfur (1C=1675 mA g$^{-1}$). The first discharge capacity was as high as 1367 mAh g$^{-1}$, demonstrating the assistance of the effective carbon interlayer in enhancing the conductivity and active material utilization. The cell with the MCP could be cycled up to 3C while maintaining a capacity above 846 mAh g$^{-1}$ for 70 cycles. As exhibited in FIG. 7(e), the cyclability at 1C rate retains over 1000 mAh g$^{-1}$ after 100 cycles, converting a retention rate of 85% with an average Coulombic efficiency of 97.6%. The charge efficiency of the first two cycles was higher than 100% due to the reutilization of the sulfur core in the cathode as the cell was cycled. The reutilization of the inactive core of the active material was generally found in the Li—S system, especially at high C rates during the initial cycles. At a higher rate of 2C for long cycles, the cell with the MCP exhibited 846 mAh g$^{-1}$ with an average Coulombic efficiency of >98% after 150 cycles; it also showed a more considerable capacity increase during the first 40 cycles compared to the cell at 1 C rate.

Another bimodal micro-/meso-porous carbon paper (micropores: ~1.5 nm; mesopores: ~9 nm) was tested as an interlayer in lithium-sulfur cells; however, the battery performance was not as good as the one with the microporous carbon interlayer. Active sulfur in the battery first transforms to long-chain $Li_2S_8$, which consists of two Li—S bonds and seven S—S bonds. Both bond types have a bond length of about 2 Å, so the longest chain length estimated among the species of polysulfides ($Li_2S_8$) is around 2 nm. Therefore, much larger pores like mesopores may not trap the migrating polysulfides efficiently during cycling because of the size effect. In contrast, microporous/small-mesoporous materials possess the advantage to absorb polysulfide intermediates due to the similar dimensions of the pores and polysulfide ions, thereby enhancing the cycling reversibility of Li—S batteries.

In summary, a microporous carbon interlayer may substantially improve the cycle performance of Li—S batteries, even as compared to batteries with a MWCNT interlayer. The flexible carbon paper provided fine contact with the cathode surface, offering electron pathways through the insulating sulfur/lithium sulfide and accommodating the migrating polysulfide intermediates. This bi-functional carbon interlayer with micropores/small-mesopores operated not only as an "upper current collector" to enhance the active material utilization but also as a "polysulfide stockroom" to retain the cyclability.

The following methods were used in Example 2:

Synthesis and Characterization

The MCP samples were prepared by mixing conductive carbon black with high surface area (Black Pearls® 2000, CABOT) and polytetrafluoroethylene binder at a 3:2 mass ratio with a small amount of isopropyl alcohol in a mortar, followed by roll-pressing and cutting into circular films. The microstructure of the samples was examined with a FEI Quanta 650 SEM and a JEOL JEM-2010F transmission electron microscope (TEM). Brunauer-Emmett-Teller (BET) surface area measurements were carried out with a volumetric sorption analyzer (NOVA 2000, Quantachrome) using physical adsorption/desorption of nitrogen gas at the liquid-nitrogen temperature. Pore size distributions were calculated according to the Barrett-Joyner-Halenda (BJH) method. Micropore surface area and volume were estimated by t-plot method.

Cell Assembly

Sulfur cathode slurry was fabricated by mixing 70 wt. % of precipitated sulfur, 20 wt. % of carbon black (Super P), and 10 wt. % of polyvinylidene fluoride (PVDF; Kureha) binder in an N-methylpyrrolidinone (NMP; Sigma-Aldrich) solution overnight. The slurry was tape-casted onto an aluminum foil and dried in an air-oven for 24 h at 50° C., followed by roll-pressing and cutting into circular electrodes. The cathode disks and MCP interlayers were dried in a vacuum oven for an hour at 50° C. before assembling the cell. The electrolyte was prepared by adding 1.85 M $LiCF_3SO_3$ (Acros Organics) and 0.1 M $LiNO_3$ (Acros Organics) salts into a mixture of 1,2-Dimethoxyethane (DME; Acros Organics) and 1,3-Dioxolane (DOL; Acros Organics) at a 1:1 volume ratio. CR2032 coin cells were assembled with the sulfur cathodes, prepared electrolyte, MCP interlayers, polypropylene separators (Celgard), and lithium foils (Aldrich).

Electrochemistry

Electrochemical impedance spectroscopy (EIS) data were obtained with a Solartron Impedance Analyzer (SI 1260+SI 1287) from 1 MHz to 100 mHz with an AC voltage amplitude of 5 mV at the open-circuit voltage of the cells with the Li metal foil as both auxiliary and reference electrodes. Discharge/charge profiles and cycle data were collected with a programmable battery cycler (Arbin Instruments). The CV plots were collected with a VoltaLab PGZ 402 Potentiostat at a scan rate of 0.2 mV/s in the voltage window of 2.8–1.5 V. Morphological characterization and elemental mapping of the MCP samples before and after cycling were carried out with a Hitachi S-5500 SEM equipped with an energy dispersive spectrometer (EDS).

Although only exemplary embodiments of the invention are specifically described above, it will be appreciated that modifications and variations of these examples are possible without departing from the spirit and intended scope of the invention.

The invention claimed is:

1. An electrochemical cell comprising:
an anode,
a sulfur-containing cathode,
a lithium-ion-containing electrolyte, and
a free-standing porous multiwall carbon nanotube (MWCNT) carbon interlayer disposed between the anode and the cathode, wherein the interlayer is permeable to the electrolyte and which comprises non-uniform pores of an average size between 50 nm and 100 nm.

2. An electrochemical cell comprising:
an anode,
a sulfur-containing cathode,
a lithium-ion-containing electrolyte, and
a free-standing microporous carbon paper (MCP) carbon interlayer disposed between the anode and the cathode, wherein the interlayer is permeable to the electrolyte and comprises uniform pores of an average size of less than 50 nm.

3. The cell of claim 2, wherein the MCP interlayer comprises uniform pores of an average size of less than 10 nm.

4. The cell of claim 2, wherein the MCP interlayer comprises uniform pores of an average size of less than 5 nm.

5. The cell of claim 1, wherein the carbon interlayer is not permeable to electrolyte-soluble polysulfides formed at the sulfur-containing cathode.

6. The cell of claim 2, wherein the carbon interlayer is not permeable to electrolyte-soluble polysulfides formed at the sulfur-containing cathode.

7. The cell of claim 1, wherein the anode is a lithium metal anode.

8. The cell of claim 1, wherein the anode is a carbon anode.

9. The cell of claim 2, wherein the anode is a lithium metal anode.

10. The cell of claim 2, wherein the anode is a carbon anode.

11. The cell of claim 1, further comprising a separator disposed between the carbon interlayer and the anode.

12. The cell of claim 2, further comprising a separator disposed between the carbon interlayer and the anode.

13. The cell of claim 1, wherein the cathode has less resistance to charge transfer than a cathode in an otherwise identical cell lacking the carbon interlayer.

14. The cell of claim 2, wherein the cathode has less resistance to charge transfer than a cathode in an otherwise identical cell lacking the carbon interlayer.

15. The cell of claim 1, wherein the carbon interlayer comprises absorbed sulfur.

16. The cell of claim 1, wherein the carbon interlayer comprises absorbed sulfur.

17. The cell of claim 2, wherein the MCP carbon interlayer comprises carbon nanoparticles between 20 nm and 40 nm in size.

* * * * *